United States Patent [19]
Grove et al.

[11] Patent Number: 5,762,374
[45] Date of Patent: Jun. 9, 1998

[54] TOW BAR MOUNTED SHIELD

[75] Inventors: Clinton E. Grove; Robert D. Grove; Kelly G. Chandler, all of Elbow Lake, Minn.

[73] Assignee: Cosmos Enterprises, Inc., Elbow Lake, Minn.

[21] Appl. No.: 579,911

[22] Filed: Dec. 28, 1995

[51] Int. Cl.⁶ .................................................. B62D 25/16
[52] U.S. Cl. ............................ 280/847; 280/770; 280/493; 296/180.4
[58] Field of Search ............................ 280/491.1, 492, 280/493, 762, 770, 847; 180/68.6; 296/180.1, 180.4

[56] References Cited

U.S. PATENT DOCUMENTS

| | | |
|---|---|---|
| 817,204 | 4/1906 | Thompson ........................ 280/154 |
| 3,746,366 | 7/1973 | Bruce et al. . |
| 3,987,863 | 10/1976 | Mittendorf et al. . |
| 4,138,130 | 2/1979 | Pickrell et al. . |
| 4,157,200 | 6/1979 | Johnson . |
| 4,706,991 | 11/1987 | Miller . |
| 4,840,400 | 6/1989 | Greenleaf . |
| 4,935,638 | 6/1990 | Straka ........................ 280/770 X |
| 4,936,599 | 6/1990 | McNamee . |
| 4,966,378 | 10/1990 | Cook . |
| 5,181,734 | 1/1993 | Brown . |
| 5,480,174 | 1/1996 | Grenier ........................ 280/414.1 |

FOREIGN PATENT DOCUMENTS 2038136  5/1992  Canada ........................... 280/491.1

OTHER PUBLICATIONS

Family Motor Coaching Magazine, Sep. 1995, p. 38, product announcement, with associated product information brochure, which was obtained from the manufacturer in Nov. of 1995.

*Primary Examiner*—Kevin Hurley
*Attorney, Agent, or Firm*—Dorsey & Whitney LLP

[57] ABSTRACT

A towing shield is provided for mounting to a tow bar. The shield apparatus has a first and a second frame section. Each frame section is substantially planar and has an inner edge and an outer edge, with the inner edge of the first section is hingedly connected to the inner edge of the second section. The shield apparatus also has a first and a second shield panel. The first panel is fastened in parallel planar relation to the first frame section, while the second panel is fastened in parallel planar relation to the second frame section. The panels form a shielding surface extending vertically from the tow bar when the frame sections are mounted in an open position. The first and second panels have a flexible peripheral portion extending beyond the outer edge of their frame sections. Either peripheral portion is adapted to flex when engaged by the rear portion of the towing vehicle when the vehicle's rear portion is caused to turn into either of the peripheral portions.

20 Claims, 7 Drawing Sheets

TOW BAR MOUNTED SHIELD

TECHNICAL FIELD

The invention relates, generally, to shielding apparatus for towed vehicles and trailers. In particular, the invention relates to an improvement for shielding from rocks and other road debris the front portion of a vehicle that is being towed with a tow bar.

BACKGROUND OF THE INVENTION

Tow bars of various types are utilized to tow a vehicle behind another vehicle, usually in combination with a standard hitch apparatus. For example, many people, while traveling with a recreational vehicle, use tow bars to tow an automobile behind the recreational vehicle to have economical access to an automobile once they have reached their destination. However, the front portion of an automobile being towed in this fashion is subject to flying debris, such as dirt, stones, or insects. This is partially attributable to the fact that with a tow bar, the towed vehicle remains close to the towing vehicle and low to the road. The debris is due to both (i) road materials that are thrown up by either the towing vehicle's rearward wheels or by other vehicles traveling on the road, and (ii) other unfavorable objects that are present in the air. Therefore, an effective towing shield is needed to protect the front portions of vehicles that are being towed.

Shielding devices have been developed to operate in connection with trailers or tow bars for shielding the towed vehicle. However, these devices have various limitations. They may be designed only to operate with a specific type of trailer or tow bar (see, e.g., Johnson U.S. Pat. No. 4,157,200; Pickrell et al. U.S. Pat. No. 4,138,130). In addition, some existing shield devices require structural support from the towed vehicle itself (see, e.g., McNamee U.S. Pat. No. 4,936,599). This makes the shield cumbersome to use, if it must be continually detached from and reattached to the towed vehicle.

Because an effective towing shield occupies a significant area in front of the towed vehicle, the shield can be exposed to damaging contact from the rearward portion of the towing vehicle when it turns sufficiently sharply.

Accordingly, what is needed in the art is a towing shield apparatus for protecting a towed vehicle. The apparatus should be universally mountable upon various types of trailers and tow bars. In addition, the shield apparatus should be structurally sound, without requiring any attachments to or support from the towed vehicle itself. Furthermore, the shielding surface should constitute a sufficient surface to effectively protect the towed vehicle from various forms of oncoming debris without being vulnerable to damage from contact with a rear portion of the towing vehicle after it has turned sufficiently sharply for such contact to occur. In addition, this shielding apparatus should be convenient to assemble for use and subsequently to disassemble for compact storage.

SUMMARY OF THE INVENTION

A towing shield is provided for mounting a tow bar that connects a towed vehicle to the rear portion of a towing vehicle. The shield apparatus has a first and a second frame section. Each frame section is substantially planar and has an inner edge and an outer edge, with the inner edge of the first section being hingedly connected to the inner edge of the second section. The frame sections are capable of rotation into an open position wherein the angle between the first and second frame sections is approximately 180 degrees. The first section further is adapted for detachable mounting to the first tower member, while the second section is adapted for detachable mounting to the second tower member when said frame sections are in the open position. The shield apparatus also has a first and a second shield panel. The first panel is fastened in parallel planar relation to the first frame section, while the second panel is fastened in parallel planar relation to the second frame section. The panels form a shielding surface extending vertically from the tow bar when the frame sections are mounted in an open position. The first panel has a flexible peripheral portion extending beyond the outer edge of the first frame section. Similarly, the second panel has a flexible peripheral portion extending beyond the outer edge of the second frame section. Either peripheral portion is adapted to flex when engaged by the rear portion of the towing vehicle when the vehicle's rear portion is caused to turn into either of the peripheral portions.

DETAILED DESCRIPTION OF THE PREFERRED EMBODIMENT a. Overall Structure

Figure 1:
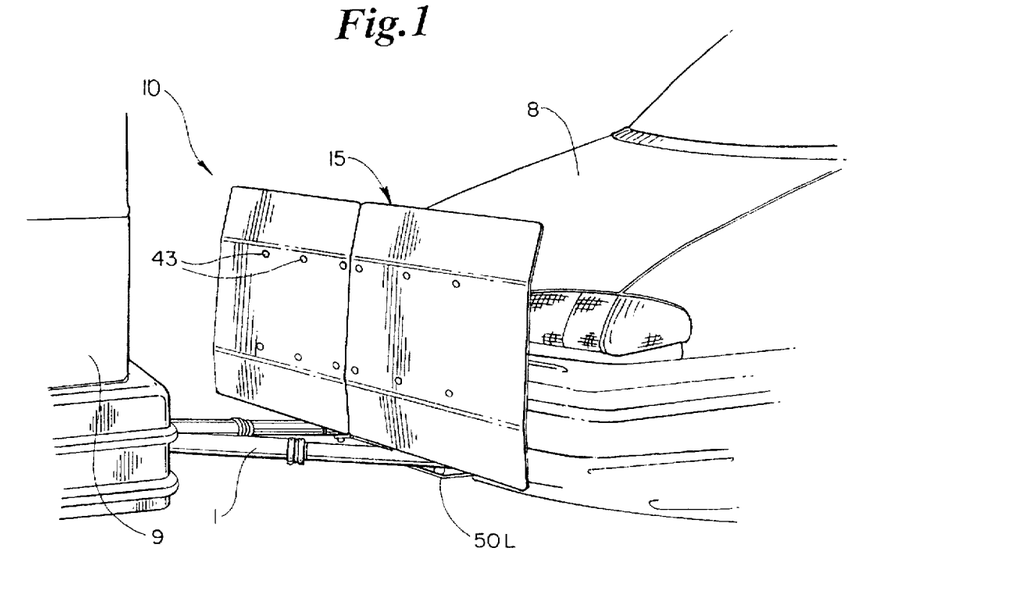
FIG. 1 is a frontal perspective view of an embodiment of the present invention mounted in position on a tow bar to shield a towed vehicle.
Figure 2:
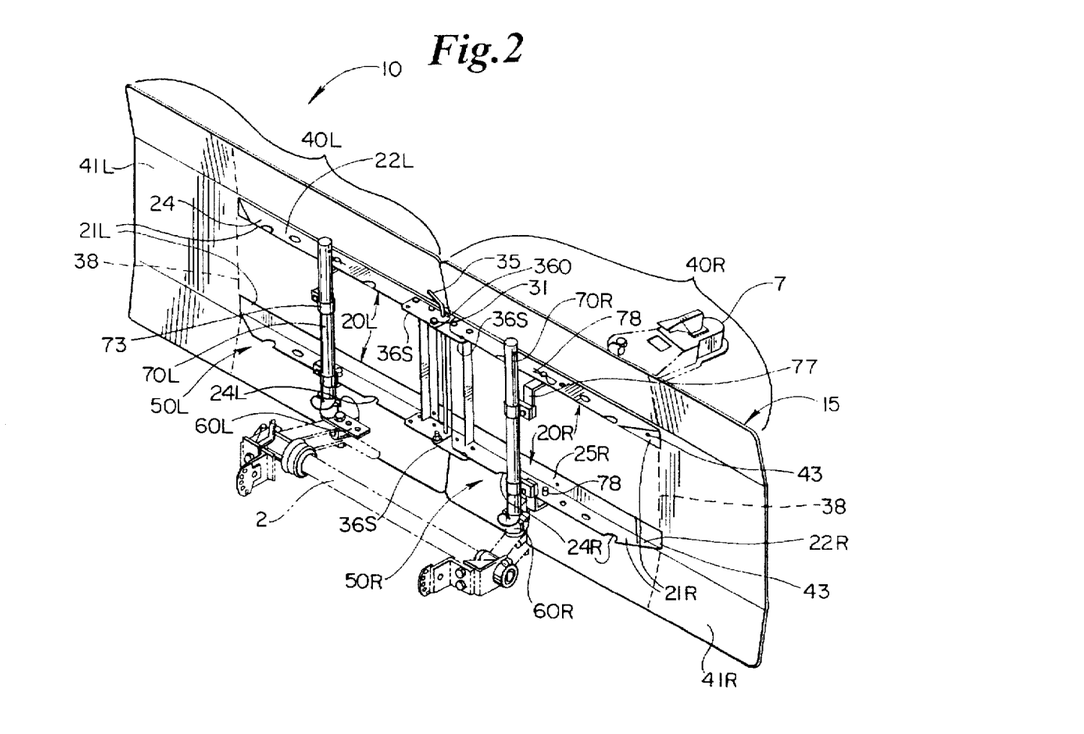
FIG. 2 is a rearward perspective view of an embodiment of the present invention mounted on a tow bar shown in phantom lines.

As shown in FIGS. 1 and 2, the present invention relates to a towing shield apparatus 10 that is mounted to a tow bar 1 for the protection of the front portion of a towed vehicle 8 while it is being towed by a towing vehicle 9, such as a recreational vehicle. The tow bar 1 extends between and connects the towed vehicle 8 or a trailer (not shown) to the rear portion of the towing vehicle 9. The apparatus 10 generally comprises a foldable shield assembly 15 that is removably mounted to a pair (left and right) of vertical tower assemblies 50L and 50R, which in turn are detachably mounted to a tow bar 1, that may be a separate bar unit or part of an A-frame type towing trailer.

Figure 7:
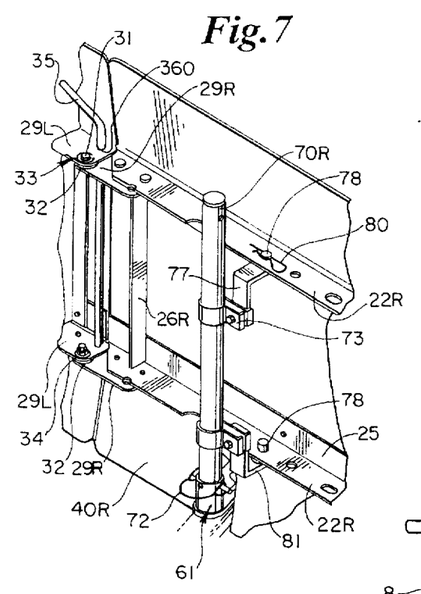
FIG. 7 is a detail, perspective view of the preferred embodiment of a tower assembly.

With reference to FIGS. 2 through 5, the shield assembly 15 has left and right symmetrical frame sections, 20L and 20R, respectively, each having an associated inner edge 37 and an outer edge 38, defined by the outer ends of the individual brackets 21L and 21R, respectively. Brackets 21L comprise an upper/lower pair which together define a generally planar frame configuration. Brackets 21R are a symmetrical upper/lower pair. Referring also to FIG. 7, the left frame section 20L, proximate to its inner edge 37, is hingedly-connected to right frame section 20R, proximate to its inner edge 37, with pivot bolts 31 passing through upper and lower hinge plates 29L and 29R. A first flexible panel 40L is fastened with fasteners 43 (preferably shoulder rivets) to the left frame section 20L; a second flexible panel 40R is fastened in the same manner to the right frame section 20R. (The flexible panels are preferably manufactured from a lightweight, resilient, flexible material such as HDPE plastic with a thickness of about 0.187 inches.)

The flexible panels 40L and 40R have peripheral portions 41L and 41R, respectively, extending beyond the outer edge 38 of the left frame section 20L and the outer edge 38 of the right frame section 20R. In addition, the flexible panels 40L and 40R preferably have clearance slots 42L and 42R (FIG. 5,) that conform about the tow bar legs 2L and 2R and through which tow bar 1 extends, to enable the panels to extend their shielding below the tow bar 1.

Figure 5:
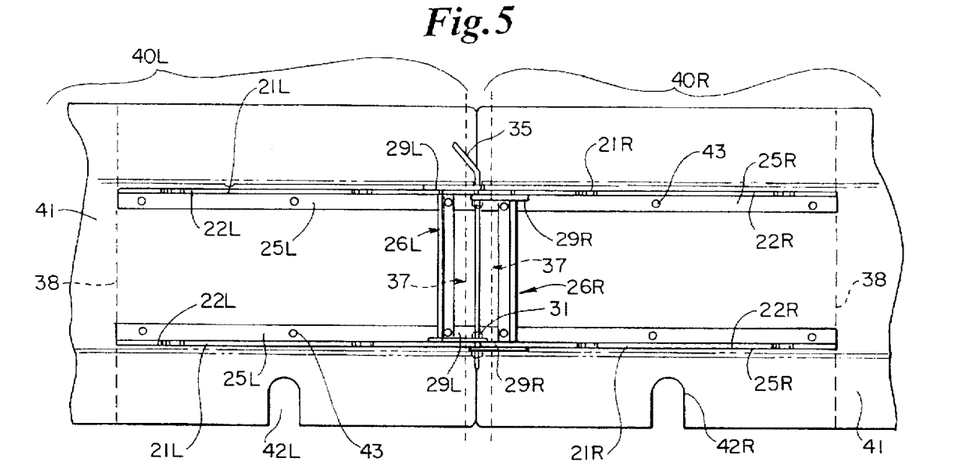
FIG. 5 is a rear elevation of an embodiment of the shield assembly with the frame sections in an open position.

Referring now to FIGS. 2 and 5, the left frame section 20L has upper and lower horizontal angle brackets 21L in substantially parallel alignment with one another. The horizontal angle brackets 21L are rigidly connected at their inner ends, in a substantially perpendicular alignment, to opposite ends of a vertical frame bracket 26L. (Due to its strength and low weight, aluminum angle stock is the preferred material for these brackets.) Each horizontal angle bracket 21L includes (i) a panel flange 25L that is substantially coplanar with flexible panel 40L in the area where panel 40L is fastened to flange 25L with fasteners 43, and (ii) a mounting flange 22L that is orthogonally fixed in parallel relation to panel flange 25L. Each mounting flange 22L includes a plurality of mounting holes 23 for adjustable and detachable mounting to a mounting pin 78 of the left tower assembly 50L. Each mounting flange 22L also includes two storage recesses 24L, each having a generally semi-circular shape for receiving and holding tower members 70L and 70R when the shield assembly 15 is folded into a storage position. The configuration of right frame section 20R is symmetrically equivalent to that of left frame section 20L.

b. Hinged Connection of Frame Sections

Referring now also to FIG. 7, a left hinge plate 29L is fixed in parallel planar relation atop each of the two left mounting flanges 22L at their ends proximate to the inner edge 37 of the left frame section 20L with portions thereof extending beyond the mounting flanges 22L. Each hinge plate 29L has a pivot bolt 31 inserted therein, and also has an open position locking hole 36O and storage position locking hole 36S. The pivot bolts in the upper and lower hinge plates 29L are axially aligned, as are the open position locking holes 36O and the storage position locking holes 36S.

In a symmetrically similar manner, right hinge plate 29R is fixed in parallel planar relation beneath each of the two right mounting flanges 22R at their ends proximate to the inner edge 37 of the right frame section with portions thereof extending beyond the mounting flanges 22R. These extended portions include holes for pivot bolts 31, open position locking holes 36O, and storage position locking holes 36S. The holes for pivot bolts 31 in the upper and lower hinge plates are axially aligned, as are the open position locking holes 36O and the storage position locking holes 36S.

The left and right hinge plates 29L and 29R (and therefore the left and right frame sections 20L and 20R) are hingedly connected to each other where they overlap. This is accomplished with a pivot bolt 31 inserted through a first flat washer 33, and a friction reduction washer 32 (such as a nylatron washer, for example), the bolt 31 being capped by a second flat washer and a connecting lock nut 34, thus enabling the frame sections 20L and 20R to pivot about an axis defined by the pivot bolts 31. A locking rod 35 may be removably inserted into open position locking holes 36O when the shield assembly 15 is opened and in mounted position on a tow bar. Alternatively, the locking rod 35 may be inserted into the storage position locking holes 36S when the shield assembly 15 is folded into a storage position.

c. Tower Assemblies

Figure 3:
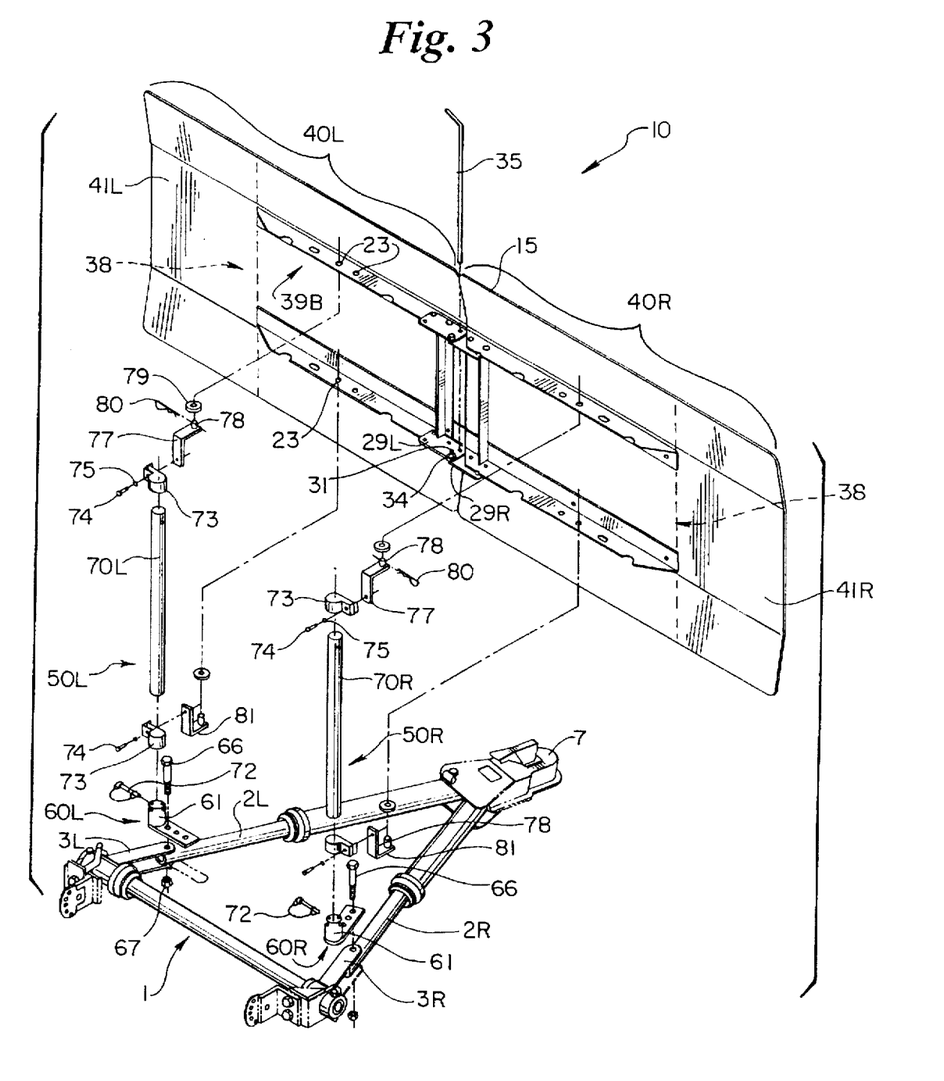
FIG. 3 is an exploded rearward perspective view of an embodiment of the present invention mounted to one form of a self-aligning type tow bar.

The description of the invention turns next to the left and right tower assemblies 50L and 50R that connect to the various different tow bar configurations and provide mounting support for the shield assembly 15. As shown in FIGS. 2, 3 and 7, the tower assemblies 50L and 50R for various embodiments are configured in a symmetrically similar manner. Therefore, discussion will be limited to an exemplary description of the left tower assembly 50L. Any differences between the left and right tower assemblies 50L and 50R will be addressed later in the specification with relation to specific tow bar mounting embodiments.

Referring now to FIGS. 3 and 7, tower assembly 50L includes upper "L" bracket 77 and lower "L" bracket 81, each mounted to a separate tower clamp 73, which together rigidly and adjustably embrace tower member 70L in axial alignment with one another. Tower member 70L (which is preferably formed from a cylindrical tube) is detachably and securely mounted to tower base 60L with the lower end of tower member 70L inserted and locked into the receptacle cup 61 of the tower base 60L. In turn, the tower base 60L is detachably mounted to the left portion of a tow bar 1.

Each upper and lower "L" bracket, 77 and 81, has a vertically disposed mounting pin 78 for insertion into a selected mounting hole 23 of the frame section 20L. Each mounting pin 78 has a hole for receiving a hair pin clip 80 to detachably lock the frame section 20L onto the "L" brackets 77 and 81. The "L" brackets are fastened to the tower clamps 73 with horizontally aligned tower clamp bolts 74, washers 75, and locking nuts (not shown). These tower clamp bolts 74 also serve to tighten the tower clamp 73 in a selected rotational position about the tower member 70L.

Figures 6A, 6B:
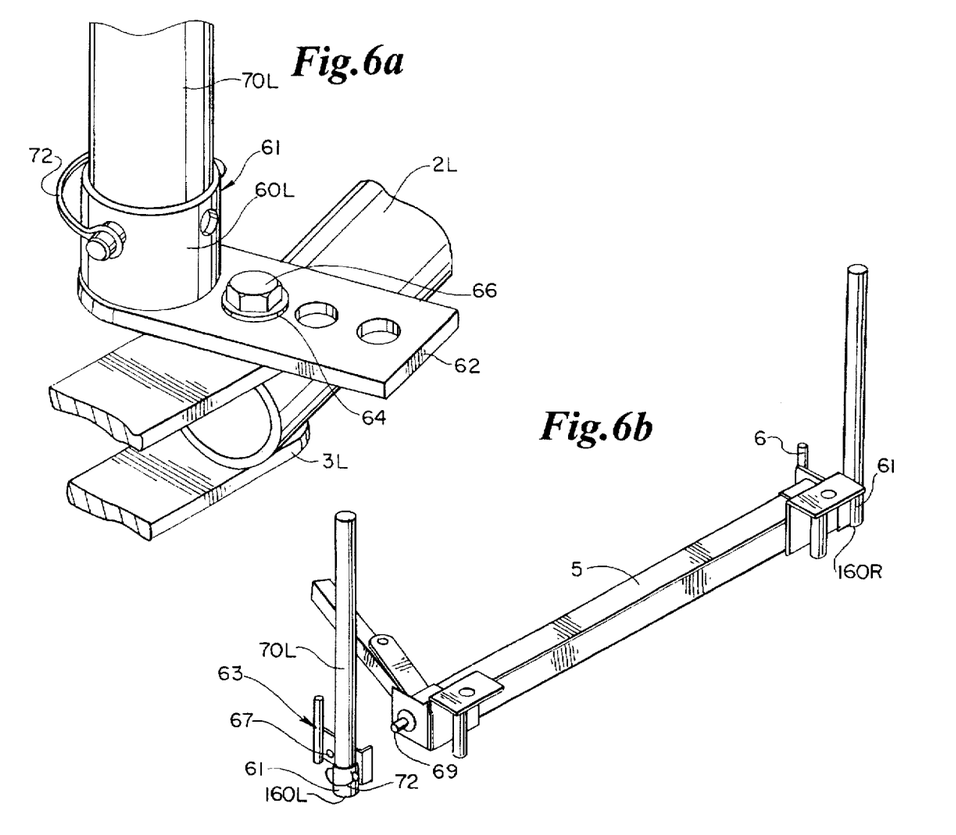
FIG. 6a is a detail, perspective view of an embodiment of a tower base mounted to one form of a self-aligning type tow bar.
FIG. 6b is an exploded, perspective view of an embodiment of a tower base and tower as in FIG. 4 mounted to a tow bar having a cross tube and a hold-up pin.

As best seen in FIG. 6a, the lower end of the tower member 70L and the receptacle cup 61 of the tower base 60L contain axially alignable holes for receiving a spring lock clamp 72 therethrough to detachably lock the tower member 70L into the receptacle cup 61 of the tower base 60L. The tower base 60L has a flange 62 with a plurality of base mounting holes 64 for receiving various mounting hardware (discussed in more detail below) to anchor the tower base 60L to a leftward portion of a given tow bar or trailer.

d. Connection of Tower Assemblies to Various Tow Bars

Figure 4:
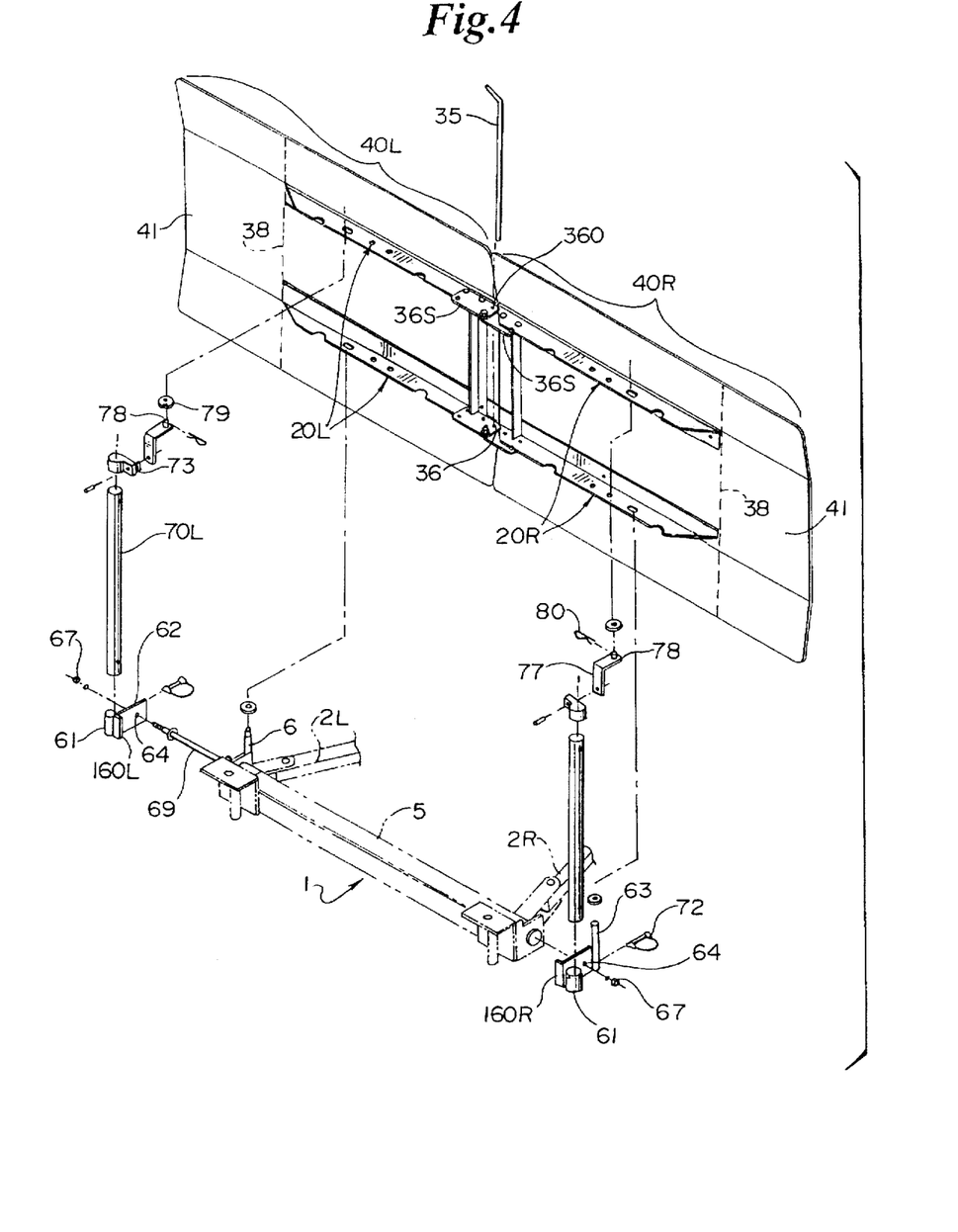
FIG. 4 is an exploded rearward perspective view of an embodiment of the present invention mounted to a tow bar having a cross tube and a hold-up pin proximate to one end of the cross tube.

FIGS. 6b to 6e, along with FIGS. 3 and 4, illustrate various tower base 60L and 60R attachment configurations for different types of commonly used tow bars. One of the advantages of the present invention is its versatility for attachment to a variety of tow bar types. For most tow bar types, a tower base 60L as shown in FIG. 6a, having a cup 61 attached to a cup flange 62 with a plurality of base mounting holes 64 is used. As will be seen, however, some tow bar types require a variation of this form of tower base.

FIG. 3 depicts tower bases 60L and 60R mounted to a self-aligning type tow bar having its tow bar legs 2L and 2R pivotally connected to tow bar tabs 3L and 3R, respectively (such as a Blue Ox™ self-aligning type tow bar, available from Automatic Equipment Mfg. Co. of Pender, Nebr.). With this embodiment, a base mounting bolt 66 is inserted through a selected base mounting hole 64, a tow bar tab 3L or 3R, and a tow bar leg 2L or 2R, and fastened to a base mount lock nut 67. The base mounting bolt 66 serves both to attach the tower bases 60L and 60R to the tow bar 1, as well as to pivotally connect the tow bar legs 2L and 2R to tow bar tabs 3L and 3R. The particular selected base mounting hole 64 will depend upon the orientation of the flange 62, with the objectives being to provide maximum support and stability to the tower bases 60L or 60R, consistent with avoiding interference with various items used in the assembly. For example, as shown in the lower right hand portion of FIG. 3, the hole 64 farthest from cup 61 is selected when the flange 62 is longitudinally aligned with the tow bar leg 2R, to provide proper alignment relative to the front of the towed vehicle 8. Contrarily, as seen at tow bar 2L the hole 64 nearest cup 61 is selected when the flange 62 is transversely disposed across tow bar leg 2L, due to spatial limitations, for example.

FIGS. 4 and 6b depict alternate tower bases 160L and 160R mounted to a tow bar 1 having a cross tube 5 and a hold-up pin 6 (e.g., a StowMASTER™ tow bar, available from Roadmaster of Portland, Oreg.). A cross tube rod 69 is axially inserted into the cross tube 5 of the tow bar 1. The cross tube rod 69 has threaded ends extending out of the cross tube 5 to receive the tower bases 160L and 160R for side mounting thereto. The right end of the cross tube rod 69 is inserted into a base mounting hole 64 and secured to the tower base 160R with base mounting lock nut 67. The left tower base 160L is secured to the other side of the cross tube rod 69 in a similar fashion. Because in this embodiment the tower bases 160L and 160R are side-mounted, the receptacle cups 61 are fixed to the bases 160L and 160R with their axes in parallel, rather than perpendicular, relation with the surface of flange 62. This enables the tower members 70L and 70R to extend vertically upward from the tow bar 1. In addition, the tow bar 1 includes a hold-up pin 6 (on the lower left side in FIG. 4), which can be used to detachably mount the lower mounting flange 22L of the frame section 20L thereto. With this configuration, tower base 160R is provided with a base mounting pin 63 to detachably mount the corresponding lower mounting flange 22R of the frame section 20R.

Figure 6C:
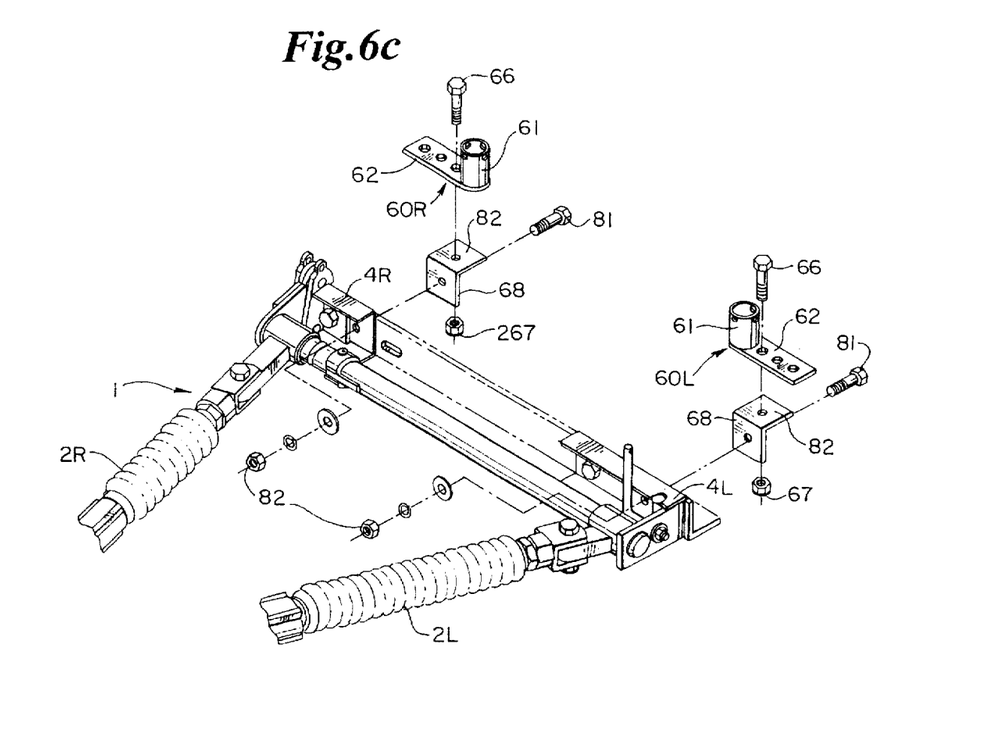
FIG. 6c is a perspective view of an embodiment of a tower base mounted to one form of a self-aligning type tow bar having receiver brackets.

FIG. 6c depicts tower bases 60L and 60R mounted to a self-aligning type tow bar having receiver brackets 4L and 4R (such as a Duncan™ self-aligning type tow bar, available from Automatic Equipment Mfg. Co., of Pender, Nebr.). Angle brackets 68 are mounted to receiver brackets 4L and 4R with angle bracket bolts 81 to provide the tower bases 60L and 60R with a horizontal platform 82. In turn, the tower bases 60L and 60R are horizontally mounted to the angle brackets 68 with the flanges 62 aligned in parallel planar relation with the horizontal platforms 82. A base mounting bolt 66 with matching nut 67 is inserted into one of the base mounting holes 64 to secure the flanges 62 to the horizontal platform 82.

Figure 6D:
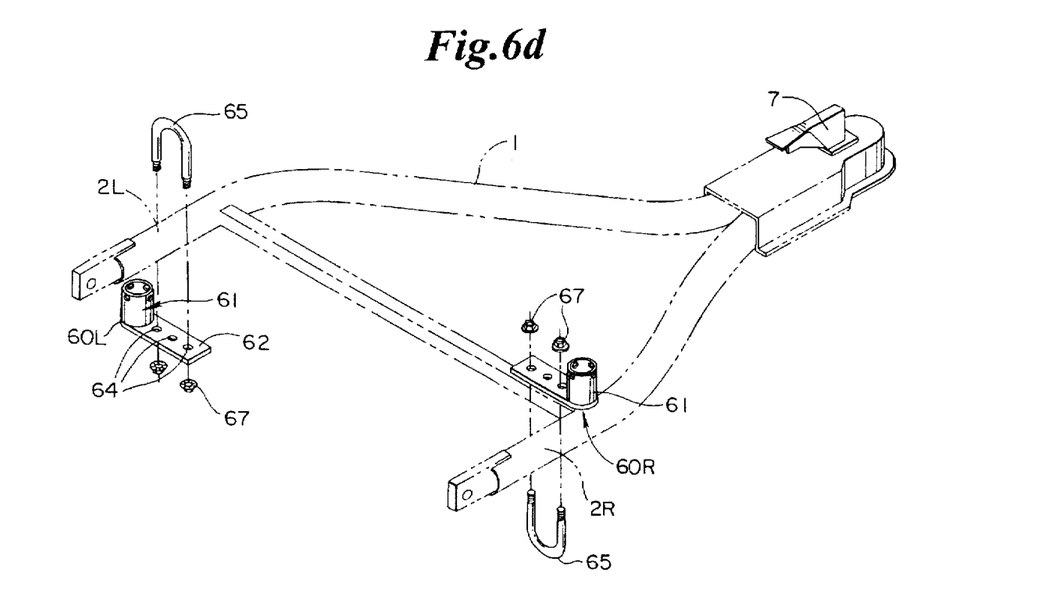
FIG. 6d is a perspective view of an embodiment of two tower bases mounted in two different ways to a tubular type tow bar having legs with a generally circular cross-section.
Figure 6E:
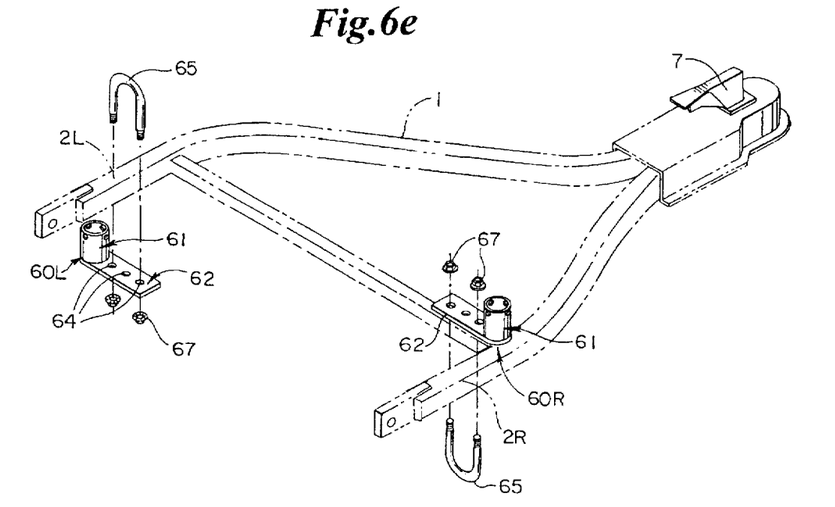
FIG. 6e is a perspective view of an embodiment of two tower bases mounted in two different ways to a tubular type tow bar having legs with a generally square cross-section.

FIGS. 6d and 6e depict tower bases 60L and 60R mounted to a tubular type tow bar having legs 2R and 2L with circular cross-sections (FIG. 6d) and rectangular cross-sections (FIG. 6e). With either embodiment, a U-bolt 65 having a general cross-sectional shape corresponding to that of the particular tow bar leg, is utilized to secure the tower bases 60L and 60R to tow bar legs 2L and 2R, respectively. The U-bolt ends are inserted into the inside and outside mounting base holes 64 of the flange 62. The U-bolts 65 can be configured to upwardly or downwardly embrace the tow bar legs 2L and 2R, with tower base flanges 62 being positioned upon or beneath tow bar legs 2R or 2L, respectively.

e. Operation

With the preceding structure in mind, the operation of the towing shield apparatus 10 can now be further explained. The invention is preferably sold as a kit consisting of the various components shown in the drawings, including any specialized hardware for mounting on a particular type of tow bar. The universal tower assembly configurations 50L and 50R of the present invention can be utilized to detachably mount the shield assembly 15 to various types of tow bars 1, as discussed in the preceding sections. The tower bases 60L and 60R are mounted to the tow bar 1 in a secure, stable position that is dictated by the particular type of tow bar 1. The only requirements are that the receptacle cups 61 extend substantially vertically upward from the tow bar 1 and that their associated longitudinal axes are substantially vertical to and parallel with one another. Even though the tower members' 70L and 70R rotational positions about their longitudinal axes are fixed to the rotational positions of the receptacle cups 61 due to the spring lock clamps 72, varying the cups' 61 rotational positions will not adversely affect the installation and alignment of the shield assembly 15, because the tower clamps 73 are rotatably adjustable about the longitudinal axes of the tower members 70L and 70R. This adjustability lends greater positional freedom in effectively anchoring the tower bases 60L and 60R to a particular type of tow bar. In addition, the tower assemblies 50L and 50R of the present invention utilize only the tow bar 1 to support the shield apparatus 15. No contact with or support from the towed vehicles is required.

With the frame sections 20L and 20R hingedly mounted together, the interior angle, which is the angle between the tower assembly sides of the sections, can range from approximately 180 degrees in an open position to approximately 0 degrees in a closed storage position. (An open position is associated with an interior angle ranging from approximately 90 degrees to 180 degrees; a storage position is associated with an interior angle that is approximately zero degrees.) A locking rod 35 is inserted into the open locking holes 36O to lock the shield into an open position with an interior angle of approximately 180 degrees. In this position, the locking rod serves to ease installation of the shield apparatus 10 by making the frame sections 20L and 20R unable to rotate, which stabilizes the alignment and adjustment of the tower assemblies 50L and 50R during installation. In addition, the locking rod adds support to the shield assembly 15 while it is being utilized to shield a towed vehicle. However, utilization of the locking rod 35 is not required for the towing shield apparatus 10 to be operatively mounted to a tow bar 1. When the locking rod 35 is not used, the towing shield apparatus 10 can be operatively mounted to a tow bar and have an associated interior angle corresponding to any open position, depending upon the positional placement of the tower bases 60L and 60R, the placement of the selected mounting holes 23 and the rotational positions of the tower clamps 73 about the tower members, for example.

Figure 9:
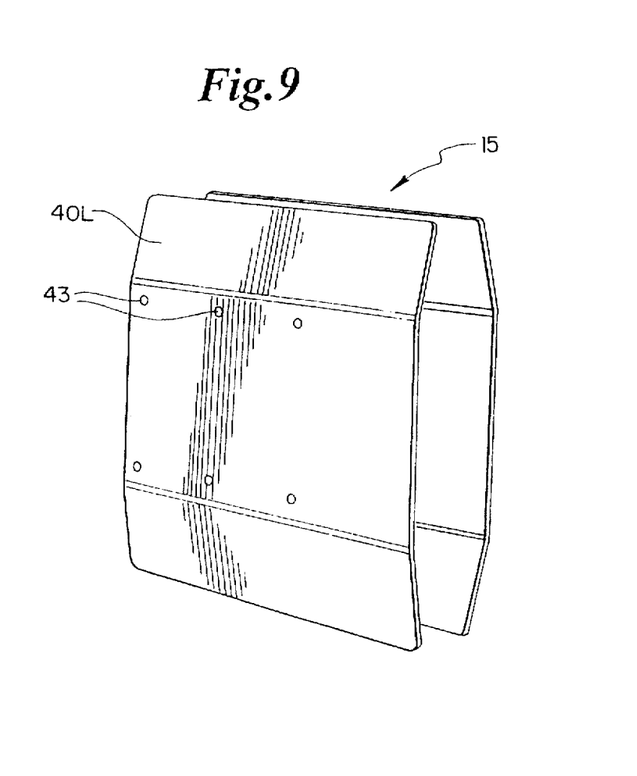
FIG. 9 is a perspective view of one embodiment of the shield assembly folded in a storage position.
Figure 10:
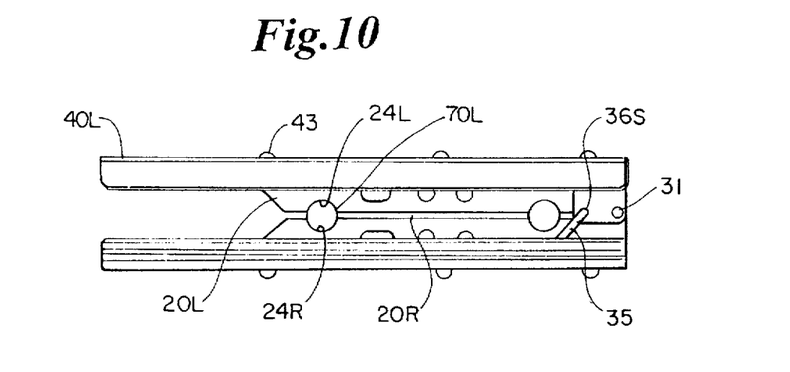
FIG. 10 is a top view of one embodiment of the present invention folded in a storage position with tower members stowed inside.

With reference to FIGS. 9 and 10, by inserting the locking rod 35 into the storage locking holes 36S, the locking rod 35 can also be used to fix the shield assembly 15 into a storage position when the shield apparatus 10 is removed from a tow bar and not in operation. In this compact folded position, the symmetrically aligned, semi-circular storage recesses 24L and 24R combine to create aligned holders for the tower members 70L and 70R. Pins inserted in the holes at either end of the tower members 70L and 70R help retain these from sliding out of the storage recesses.

Figure 8:
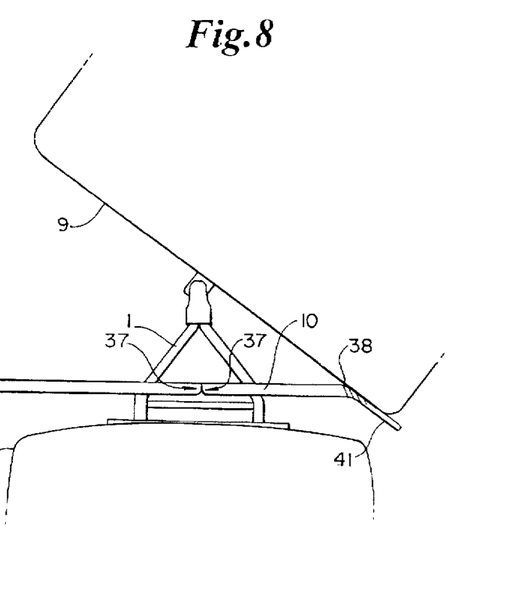
FIG. 8 is a top view of one embodiment of the present invention depicting flexing of a peripheral portion of the shield assembly when engaged by a rear portion of a towing vehicle.

With reference to FIG. 8, the peripheral portions 41L and 41R of the flexible panels 40L and 40R, flex without breaking or damaging the towing vehicle when engaged by the rear portion of a towing vehicle 9 that has turned sufficiently sharply for such engagement to occur. For this design feature to be effective, a flexible, yet resilient, material such as HDPE plastic, for example, should be utilized for the flexible panels 40L and 40R.

It will be seen by those skilled in the art that various changes may be made without departing from the spirit and scope of the invention. For example, it will be clear that the invention could be implemented with base pins inserted into hollow ends of the tower members, rather than utilizing receptacle cups for receiving the tower members. In addition, tapered tower members or tower members with polygonal cross-sections could be utilized, in addition to cylindrically shaped members. Accordingly, the invention is not limited to what is shown in the drawings and described in the specification but only as indicated in the appended claims.

What is claimed is:

1. A towing shield apparatus for mounting to a tow bar that connects a towed vehicle to a rear portion of a towing vehicle, the apparatus comprising:

a first and a second tower base, each base adapted to be removably and rigidly mounted to the tow bar at a location spaced from the other base;

a first and a second tower member, the first tower member detachably mounted to the first tower base, the second tower member detachably mounted to the second tower base, the first and second tower members extending substantially vertically upward from the tow bar when the towing shield apparatus is mounted to the tow bar and being in substantially parallel, spaced relation with one another;

a first and a second frame section, each frame section being substantially planar and having an inner edge and an outer edge, wherein the inner edge of the first section is hingedly connected to the inner edge of the second section, the sections being capable of rotation into an open position, the first section further being adapted for detachable mounting to the first tower member and the second section being adapted for detachable mounting to the second tower member when said frame sections are in an open position; and a first and a second shield panel, the first panel being fastened in parallel planar relation to the first frame section, the second panel being fastened in parallel planar relation to the second frame section, whereby the panels form a shielding surface extending vertically from the tow bar when the frame sections are mounted in an open position, the first panel having a flexible peripheral portion extending beyond the outer edge of the first frame section, the second panel having a flexible peripheral portion extending beyond the outer edge of the second frame section, whereby either peripheral portion is adapted to flex when engaged by the rear portion of the towing vehicle when the vehicle's rear portion is caused to turn into either of the peripheral portions.

2. The apparatus of claim 1, wherein at least one of the tower bases includes a U-bolt adapted to connect the base to a horizontal member of the tow bar when the towing shield apparatus is mounted to the tow bar the U-bolt's cross-sectional shape adapted to generally surround and conform to that of the horizontal member.

3. The apparatus of claim 1, wherein at least one of the tower bases includes a receptacle cup to securely receive an end of a respective tower member for detachable mounting thereto.

4. The apparatus of claim 1 wherein each tower member has a longitudinal axis and further comprises a plurality of tower clamps for detachably mounting each frame section to a corresponding one of the tower members, each clamp having a substantially circular cross-section with an adjustable diameter for rigidly embracing the tower member, whereby each clamp's rotational position about the longitudinal axes of the tower members is adjustable.

5. The apparatus of claim 4, wherein each tower clamp includes an upwardly extending mounting pin and each frame sections includes a plurality of generally horizontally-disposed mounting pin holes with axes that are generally in parallel alignment with the corresponding mounting pin, whereby the frame sections are adapted to be detachably mounted to the tower members with each mounting pin inserted into one of the mounting pin holes.

6. The apparatus of claim 5, wherein the first frame section comprises two generally horizontally-disposed angle brackets, each bracket having (i) a panel flange that supports and is fastened to the first shield panel, and (ii) a mounting flange that is generally orthogonal to the panel flange and contains the mounting pin holes.

7. The apparatus of claim 6 further comprising a removable locking rod that cooperates with and is capable of locking the hingedly connected frame sections into (i) an open position with an interior angle of substantially 180 degrees, and (ii) a storage position wherein the interior angle is substantially zero degrees.

8. The apparatus of claim 7, wherein the first and second frame sections each include at least one pair of vertically aligned storage recesses, wherein the pair of vertically aligned storage recesses of the first frame section is in symmetrical alignment with the pair of recesses from the second frame section to form a storage channel for a tower member when the first and second frame sections are in a storage position with an interior angle of substantially 0 degrees.

9. The apparatus of claim 1 wherein the first and second shield panels are each fastened to their respective frame sections with shoulder rivets, thereby enabling the first and second shield panels to contract and expand without harming the structure of the shield apparatus.

10. The apparatus of claim 1, wherein the first and second shield panels each include a clearance slot through which the tow bar may extend to enable each panel to extend below the tow bar when the shield apparatus is mounted to the tow bar.

11. The apparatus of claim 1, wherein the towing shield apparatus is for mounting to a tow bar that comprises an A-frame with a right leg and a left leg, the first tower base includes a U-bolt to removably and rigidly connect the first base to the left leg of the A-frame, and the second tower base includes a U-bolt to removably and rigidly connect the second base to the right leg of the A-frame when the towing shield apparatus is mounted to the tow bar.

12. The apparatus of claim 1, wherein the towing shield apparatus is for mounting to a tow bar that comprises a tubular type tow bar with left and right legs, wherein the first tower base includes a U-bolt to removably and rigidly connect the first base to the left leg of the tow bar, and the second tower base includes a U-bolt to removably and rigidly connect the second base to the right leg of the tow bar when the towing shield apparatus is mounted to the tow bar.

13. The apparatus of claim 1, wherein the towing shield apparatus is for mounting to a tow bar that comprises a self-aligning tow bar, the self-aligning tow bar having a left leg pivotally connected to a left tow bar tab with a left pivot pin and a right leg pivotally connected to a right tow bar tab with a right pivot pin the first base being adapted to removably and rigidly mount to the left leg with the left pivot pin and the second base being adapted to removably and rigidly mount to the right leg with the right pivot pin when the towing shield apparatus is mounted to the tow bar.

14. The apparatus of claim 1, wherein the towing shield apparatus is for mounting to a tow bar that comprises a self-aligning type tow bar, the self-aligning type tow bar having a left receiver bracket and a right receiver bracket, the first base being adapted to removably and rigidly mount to the left receiver bracket, and the second base being adapted to removably and rigidly mounted to the right receiver bracket when the towing shield apparatus is mounted to the tow bar.

15. The apparatus of claim 1, wherein the towing shield apparatus is for mounting to a tow bar that has (i) a horizontally disposed cross tube with a longitudinal channel, and (ii) a hold-up pin proximate to an end of the longitudinal channel and extending vertically upward from the tow bar, the towing shield apparatus further comprising a cross tube rod to be removably inserted within the horizontal channel of the cross tube and having ends that extend beyond the cross tube when the rod is inserted into the horizontal channel the first base being adapted to removably and rigidly mount to the end of the cross tube rod that is proximate to the hold-up pin, the second base being adapted to removably and rigidly mount to the other end of the cross tube rod when the towing shield apparatus is mounted to the tow bar.

16. A mounting apparatus for mounting a shield to a tow bar that connects a towed vehicle to a rear portion of a towing vehicle, the apparatus comprising:

a first and a second tower base, each base adapted to be removably and rigidly mounted to the tow bar at a location spaced from the other base; and a first and a second tower member, the first tower member detachably mounted to the first tower base, the second tower member detachably mounted to the second tower base, the first and second tower members adapted to extend substantially vertically upward from the tow bar and be in substantially parallel, spaced relation with one another when the mounting apparatus is mounted to the tow bar wherein the shield is adapted to be mounted to the first and second tower members when the mounting apparatus mounts the shield to the tow bar.

17. The apparatus of claim 16, wherein at least one of the tower bases further comprises (i) a receptacle cup to securely receive an end of a tower member for detachable mounting thereto, and (ii) a flange with a plurality of mounting holes for receiving a bolt to anchor the tower base to the tow bar.

18. The apparatus of claim 16 wherein each tower member is a generally cylindrical tube with a longitudinal axis and further comprising a plurality of tower clamps for detachably mounting the shield to the tower member, each clamp having a substantially circular cross-section with an adjustable diameter for rigidly embracing the tower member, whereby each clamp's rotational position about the longitudinal axes of the tower members is adjustable.

19. A towing shield apparatus for mounting to a tow bar that connects a towed vehicle to the rear portion of a towing vehicle, the apparatus comprising:

a first and a second frame section, each frame section being substantially planar and having an inner edge and an outer edge, wherein the inner edge of the first section is hingedly connected to the inner edge of the second section, the sections being capable of rotation into an open position and adapted for detachable mounting to the tow bar when said frame sections are in this open position; and a first and a second shield panel, the first panel being fastened in parallel planar relation to the first frame section, the second panel being fastened in parallel planar relation to the second frame section, whereby the panels form a shielding surface extending vertically from the tow bar when the frame sections are mounted to the tow bar, the first panel having a flexible peripheral portion extending beyond the outer edge of the first frame section, the second panel having a flexible peripheral portion extending beyond the outer edge of the second frame section, whereby either peripheral portion is adapted to flex when engaged by the rear portion of the towing vehicle when the vehicle's rear portion is caused to turn into either of the peripheral portions.

20. A towing shield apparatus kit for assembling and mounting a towing shield apparatus to a tow bar that connects a towed vehicle to the rear portion of a towing vehicle, the kit comprising:

a first and a second tower base, each base adapted to be removably and rigidly mounted to the tow bar at a location spaced from the other base;

a first and a second tower member, the first tower member adapted to be detachably mounted to the first tower base, the second tower member adapted to be detachably mounted to the second tower base, the first and second tower members, once mounted to the tower bases, extending substantially vertically upward from the tow bar and being in substantially parallel, spaced relation with one another when the towing shield apparatus is assembled and mounted to the tow bar;

a first and a second frame section, each frame section being substantially planar and having an inner edge and an outer edge, wherein the inner edge of the first section is hingedly connected to the inner edge of the second section, the sections being capable of rotation into an open position, the first section further being adapted for detachable mounting to the first tower member and the second section being adapted for detachable mounting to the second tower member when said frame sections are in an open position; and a first and a second shield panel, the first panel being fastened in parallel planar relation to the first frame section, the second panel being fastened in parallel planar relation to the second frame section, whereby the panels form a shielding surface extending vertically from the tow bar when the towing shield apparatus is assembled and mounted to the tow bar, the first panel having a flexible peripheral portion extending beyond the outer edge of the first frame section, the second panel having a flexible peripheral portion extending beyond the outer edge of the second frame section, whereby either peripheral portion is adapted to flex when engaged by the rear portion of the towing vehicle when the vehicle's rear portion is caused to turn into either of the peripheral portions.

* * * * *

UNITED STATES PATENT AND TRADEMARK OFFICE
CERTIFICATE OF CORRECTION

PATENT NO. : 5,762,374
DATED : June 9, 1998
INVENTOR(S): Clinton E. Grove, Robert D. Grove, Kelly G. Chandler It is certified that error appears in the above-identified patent and that said Letters Patent is hereby corrected as shown below:

In column 1, line 59, delete "mounting a" and insert --mounting to a--.

In column 4, line 57, delete "tower damp 73" and insert --tower clamp 73--.

In column 7, line 10, delete "fold ed" and insert --folded--.

In column 7, line 14, delete "member s" and insert --members--.

In column 8, line 12, delete "to the tow bar the" and insert --to the tow bar, the--.

In column 9, line 20, delete "pivot pin the first" and insert --pivot pin, the first--.

In column 9, line 43, delete "channel the" and insert --channel, the--.

In column 9, line 61, delete "tow bar wherein" and insert --tow bar, wherein--.

Signed and Sealed this

Twenty-ninth Day of September, 1998

Attest:

BRUCE LEHMAN

*Attesting Officer*  *Commissioner of Patents and Trademarks*